W. H. LEAVITT.
TYING DEVICE FOR HAY BALERS.
APPLICATION FILED NOV. 9, 1912.
1,073,499.
Patented Sept. 16, 1913.
2 SHEETS—SHEET 1.
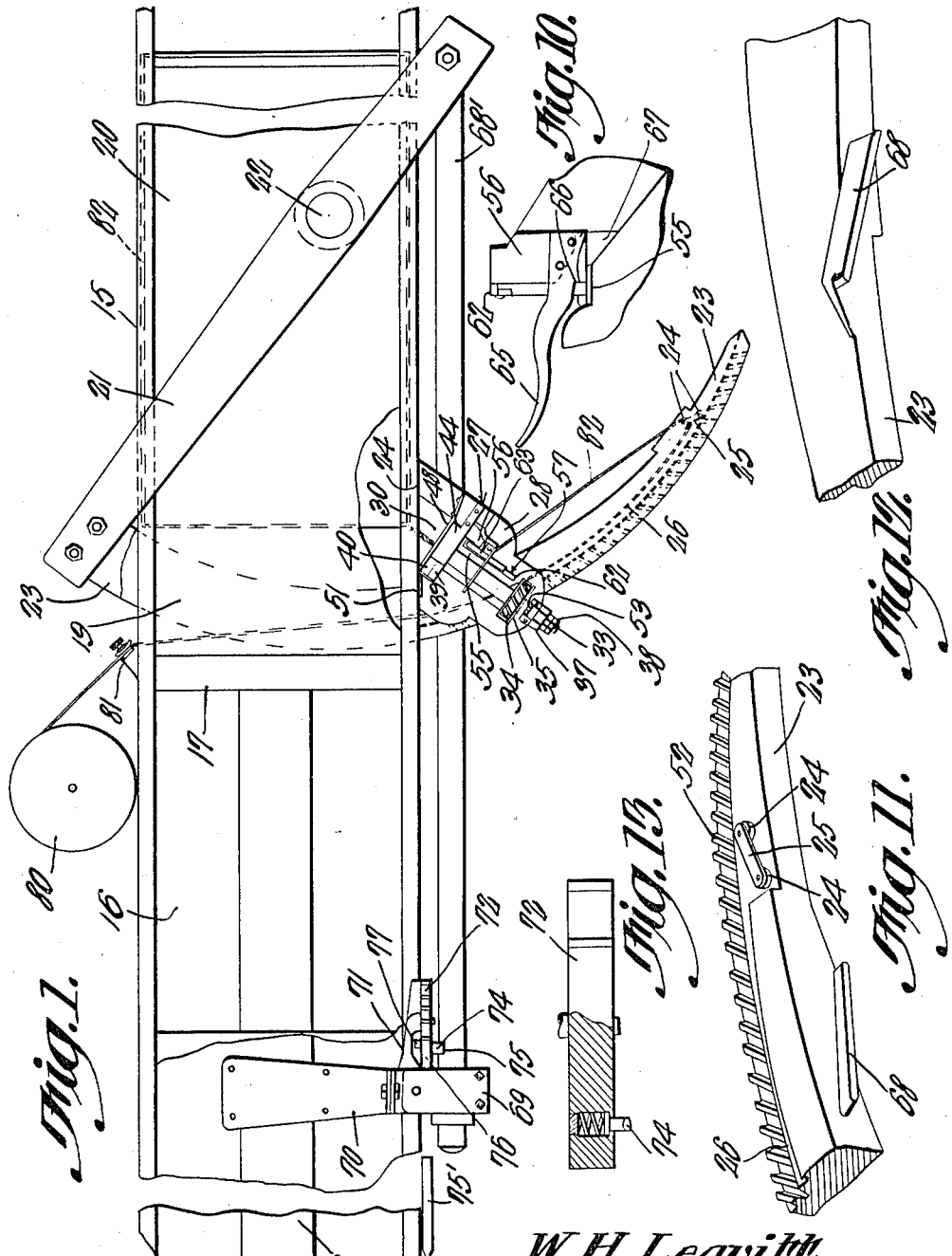
Witnesses
W. H. Leavitt  Inventor
by C. A. Snow & Co.  Attorneys

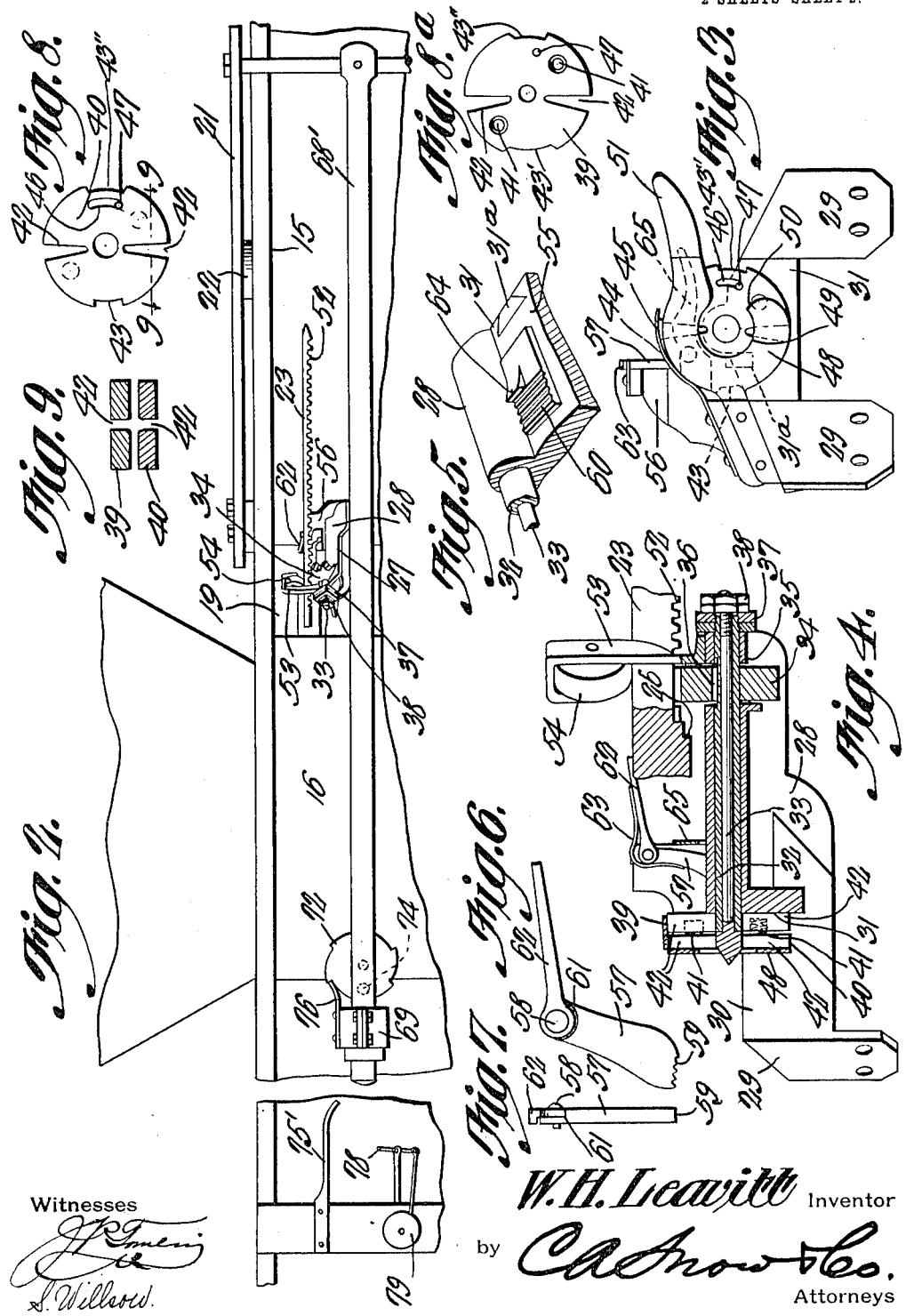

UNITED STATES PATENT OFFICE.

WILLIAM H. LEAVITT, OF STAMFORD, TEXAS.

TYING DEVICE FOR HAY-BALERS.

1,073,499.   Specification of Letters Patent.   Patented Sept. 16, 1913.

Application filed November 9, 1912. Serial No. 730,448.

*To all whom it may concern:*

Be it known that I, WILLIAM H. LEAVITT, a citizen of the United States, residing at Stamford, in the county of Jones and State of Texas, have invented a new and useful Tying Device for Hay-Balers, of which the following is a specification.

The present invention appertains to automatic tying devices for hay balers and the like, the same being an improvement over the tying device disclosed in my former Patent No. 970,065 issued September 13, 1910.

It is the object of the present invention to generally improve tying devices of the class to which the present invention relates, as well as to increase the efficiency and utility thereof.

The present invention also contemplates the provision of novel means for automatically operating the tying device after a certain number of strokes of the plunger have been made.

To the above and other ends, which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

The invention has been illustrated in the accompanying drawings, wherein like reference characters have been employed to denote corresponding parts, and wherein:—

Figure 1 is a plan view of a portion of a hay baler, parts being broken away, showing the present invention applied thereto. Fig. 2 is a fragmental side elevation thereof. Fig. 3 is an end view of the knotting or twisting mechanism. Fig. 4 is a longitudinal vertical section of the knotting mechanism. Fig. 5 is a fragmental detail in perspective. Fig. 6 is an elevation of a portion of the wire holder or grip. Fig. 7 is an end elevation of the parts shown in Fig. 6. Fig. 8 is a face view of the inner knotting disk. Fig. 8ᵃ is a face view of the outer knotting disk. Fig. 9 is a sectional detail taken in the line 9—9 of Fig. 8. Fig. 10 is a fragmental detail in elevation. Figs. 11 and 12 are fragmental perspective views of the needle. Fig. 13 is a top view of a ratchet wheel, partly broken away, which is employed for bringing the tying device into operation after a certain number of strokes of the plunger.

The numeral 15 designates the bale chamber of the hay baler through which the bales pass from the compressing chamber 16, a plunger 17 reciprocating into the compressing chamber 16 and being actuated by the plunger rod 18, as usual. The said parts are merely illustrated diagrammatically, and as they are common and well known in the art, need no further description.

In carrying out the present invention, the head block 19 is preferably secured to the plunger 17 so as to strike the end of the newly completed bale 20, the said head block having slots therein through which the needles of the tying device are adapted to pass.

A U-shaped needle yoke 21 straddles the bale chamber 15 from the rear side as seen in the drawings, the respective arms of the yoke standing above and below the bale chamber and being fulcrumed to the frame of the bale chamber, as designated at 22. The free ends of the arms of the yoke are adapted to oscillate at the other or far side of the bale chamber and have secured thereto the arcuate or curved needles 23, which needles are adapted to pass through the slots in the head block 19 after the head block has been forced inwardly by the plunger 17. As illustrated a pair of the needles have been employed, but it is understood that any number of needles and complementary knotting mechanisms may be provided. The eyes of the needle are formed by a pair of rollers or pulleys 24 pivoted to each needle adjacent its tip, each pair of rollers being connected at their outer faces by a metallic strip or strap 25, which completes the needle eye. The rollers 24 are arranged obliquely or diagonally relative to the needle, as clearly apparent in Fig. 1, and the rollers are also disposed on the bottom sides of the needles to coöperate with the knotting mechanisms as hereinafter described. Each needle is also provided with a grooved ledge 26 extending from its eye to an intermediate point, in which the strand of wire carried by the needle is adapted to lie.

The knotting or twisting mechanism for the ends of the band engaging the bale has been designated generally by the numeral 27, it being understood that one of these knotting mechanisms is employed in connection with each needle. Each knotting mechanism comprises a shell or frame 28 having its inner end standing obliquely or diagonally, as indicated by the numeral 29, said inner end being secured to the side of the bale chamber frame adjacent the forward end of the frame and at a suitable point thereon, thereby positioning the frame 28 and the knotting mechanism obliquely or diagonally relative to the bale chamber frame in order to effect a better knotting or twisting of the ends of the band. The inner end of the frame 28 is also provided with a recess 30 forming an abutment 31, a shear or knife blade 31ª being dove-tailed into the abutment 31. The top of the frame 28 is in the form of a gable, or slopes from a central longitudinal line toward each side. A longitudinal tubular shaft 32 is journaled through the frame 28 adjacent the ridge thereof and extends from the abutment 31 to the outer end of the frame, while a solid shaft 33 is journaled through the tubular shaft 32. In order to provide means for actuating the outer or tubular shaft 32, a pinion 34 is mounted thereon adjacent its outer end, the said pinion working within an opening 35 in the frame 28 so as to be constrained against longitudinal movement, and the said pinion carrying a feather 36 working in a longitudinal feather way provided in the shaft 32, thus permitting the shaft 32 to be adjusted longitudinally relative to the frame and the pinion without affecting the operative relation of the said shaft 32 and the pinion. A pair of jam nuts 37 are screw threaded onto the outer end of the tubular shaft 32 and bear against the outer end of the frame 38, and a pair of jam nuts 38 are screw-threaded onto the outer end of the shaft 33 and bear against the jam nuts 37 or the end of the shaft 32. To the inner ends of the respective shafts 32 and 33 are attached the knotting or twisting disks 39 and 40, the outer disk 39 working against the abutment 31 over the shear or knife blade 31ª. It will be seen at this point, that by tightening the jam nuts 37, the disk 39 may be adjusted relative to the abutment, or the friction between the said disk and abutment may be increased or diminished. It will also appear that by adjusting the jam nuts 38 on the shaft 33, the disks 39 and 40 may be spaced apart more or less in order to accommodate the particular gage of wire employed for tying the bale, as will be more clearly understood as the description proceeds. The outer disk 39 also carries a pair of diametrically opposite friction devices 41 for engaging the disk 40 in order that the disk 40 may be carried with the disk 39 unless it is restrained against rotation. Each of the knotting or twisting disks are provided with a pair of opposite open slots 42 arranged to one side of a diametrical line, which are adapted to receive the wire or the ends of the bale engaging band. The inner and outer disks are provided with the respective deep peripheral notches 43 and 43′, which are wider than the slots 42, and into which a lug 45 overhanging the disks and carried by a spring 44 is adapted to snap or engage. The notch 43 is so positioned relative to the slots 42, or at quadrants therewith, that when the lug 45 engages in the notch 43 the slots 42 will be held horizontally or in wire receiving position. The ends of the notch 43 or the shoulders formed by the notch are square and the notch 43 is designed to snugly receive the lug 45 so that the disk 40 may be restrained from turning, whereas the notch 43′ is longer and has its ends or shoulders beveled or inclined so as to raise the lug 45 from out of the notch 43 after the disk 39 has turned slightly while the disk 40 is held by the lug 45 so as to bring the slots 42 of the two disks out of registration. The two disks are each provided with a shallow notch or recess 43″ opposite the respective notches 43 and 43′, the ends or shoulders of the notches 43″ being beveled or inclined. The lug 45 is adapted to engage lightly in the notches 43″ so as to normally hold the disks in wire receiving position when the needles are retracted. It is also essential that the inner knotting disk 40 should only have a limited swinging or rotary movement relative to the outer disk 39, this being accomplished by means of an arcuate slot 46 provided in the inner disk through which a pin 47 engages or works, the pin being secured to the outer disk. The pin and slot are so arranged that when the disk 39 is rotated forwardly, due to the forward stroke of the needle as will hereinafter appear, the outer disk may rotate relative to the inner disk in order to bring the slots 42 out of registration, and after the slots have been brought out of registration sufficiently, the pin 47 serving to carry the inner disk with the outer disk in a positive manner. Conversely, when the outer disk is rotated backward, due to the retraction of the needle, the pin 47 will strike the other end of the slot 46, so that the slots 42 of the two disks are in registration, and the inner disks will then be carried positively with the outer disk, for the purposes hereinafter described.

The parts just described comprise the knotting or twisting mechanism in its essentials, a guard for the said mechanism also being provided. This guard consists in a plate 48 carried by the frame 28 and standing over the inner face of the inner disk 40, the plate having an opening 49 which is smaller in diameter than the disks, in order that when the ends of the bands are twisted together, they may not slip out of the ends of the slots 42, as will be understood, particularly when reference is had to the aforementioned patent. The opening 49 has a mouth 50 for receiving the wire, a guide finger 51 projecting from the top of the guard to assist in directing the wire into the registering slots of the knotting or twisting disks.

Each of the needles 23 is provided with a rack 52 adapted to intermesh with the pinions 34 when the needle is projected through the head block and with a cam 68. The teeth of the pinion and rack are each set obliquely, as clearly illustrated in Fig. 1, it being understood that the racks of the upper and lower needles are arranged on the lower sides of the needles. In order to hold the needle in mesh with the pinion, a bracket 53 has been secured to the outer end of the frame 28 and carries an overhanging roller 54 adapted to contact with the upper face of the upper needle, whereas the reverse is the case with the lower needle, as will be understood.

The wire holder or grip is mounted on the frame 28 directly outside of the knotting or twisting disks, and to one side of the axis thereof, or the axis of the shafts 32 and 33. For convenience, the side of the axis of the knotting disks to which the wire holder or grip has been set will be called the farther side, due to the fact that it is arranged on the side farthermost from the needle. The frame 28 is provided with a longitudinal seat or shoulder 55 adjacent its ridge and on the far side of the ridge, and a post or upright 56 projects from the frame adjacent the seat 55 at its inner end. The wire holder or grip proper has been designated by the numeral 57, and the same being fulcrumed or pivoted to the post 56 by means of the pivot 58 and having its free end in the form of a toothed cam face 59 coöperating with the toothed boss 60 on the seat 55. The holder or grip 57 is adapted to swing away from the toothed boss 60 in an inward direction, or toward the disks. The inner or fulcrumed end of the holder 57 is rabbeted or cut away, as designated by the numeral 61, and a lever 62 is fulcrumed to the pivot 58 within the said rabbeted or cut away portion, in order that the said lever may swing upward without affecting the holder, and may swing downward so as to swing the holder upward. The holder 57 and the lever 62 are both given a downward swinging tendency by means of a double leaf spring 63 secured to the upper end of the post 56 and engaging the holder and lever, respectively. Thus, the holder 57 will normally be depressed into engagement or coöperation with the toothed boss 60, and the lever 62 will be normally depressed, but not sufficiently to raise the holder. The lever 62 is normally held in an inclined position, as clearly shown in Fig. 4, the spring 63 preventing the said lever from being thrown upwardly or out of operative position. A projection 64 rises from the boss 60 adjacent the inner face of the holder 57, for the purpose which will hereinafter appear.

A guide finger 65 is secured at its butt end to the post 56 and projects over the ridge of the frame 28 to guide the wire carried by the needle over the ridge and under the wire holder or grip, the said finger being provided with a shoulder 66 at its heel for preventing the wire from swinging excessively, or beyond the wire holder or grip. The post 56 is also provided with a chute or passage 67 leading downward from the wire holder or grip, and the guide finger serves to direct the wire carried by the needle over the boss 60 and under the wire holder or grip in such a manner as to wipe the short piece of wire therebetween out through the chute or passage 67 and from the knotting or twisting mechanism. This short piece of wire is left under the holder after the wire has been cut, just previous to the knotting or twisting of the ends of the band, as will hereinafter more fully appear.

As a means for automatically actuating the tying device, there has been provided the following mechanism: A pitman 68' is connected to the intermediate portion of the needle yoke 21 by a knuckle or universal joint, and is adapted to oscillate between the two tying devices, said pitman extending forwardly to a point beyond the compressing chamber 16, and working through a journal bearing 69 connected by knuckle or universal joint to an arm 70 carried by the plunger rod 18. The bearing 69 in being pivoted to the arm 70 will permit the bearing to swing with the pitman, when the pitman is actuated. This pitman is actuated at intervals, or intermittently, by means of a ratchet wheel 72 pivoted to an extension 71 of the bearing 69, the said ratchet wheel carrying a yielding wrist pin 74 on its outer face, which is adapted to be swung into a notch or slot 75 in the pitman, during each revolution thereof. The ratchet wheel is given an intermittent or step by step movement, in order that it will rotate once for every six or seven complete strokes of the plunger rod 18, this result being obtained by means of a dog or pawl 75' carried by the hay baler frame at the forward end thereof, and in the path of the ratchet wheel. The pawl or dog 75' is arranged in such a position that when the plunger rod 18 is in its outermost position, or at the end of its outward stroke, the dog will engage one of the teeth of the ratchet wheel and will turn the ratchet wheel through a suitable arc. The ratchet wheel is prevented from retrograde or reverse movement by means of a pawl or dog 76 carried by the bearing 69 and continually engaging the ratchet wheel. The pitman 68' normally stands in its most forward position, so that the needles 23 are retracted to the far side of the bale chamber during the formation of the bale. An audible signal is also provided for warning the feeder when it is time for the ends of the bands engaging the bale to be knotted or twisted together, in order that he may withhold the charge of hay during the knotting or twisting operation. The audible signal mechanism is actuated by a tappet 77 carried by the inner face of the ratchet wheel 72, the said tappet being brought into the path of an actuating member 78 for a gong 79 carried by the hay baler frame. The tappet 77 and actuating member 78 are so arranged, that the gong will be sounded just prior to the knotting or twisting of the ends of the bands, thus warning the feeder.

A spool of wire 80 is mounted at the far side of the hay baler frame, it being understood that a spool of wire is provided for each mounting mechanism, and a suitable tension device 81 is provided adjacent each spool.

The wire band for the bale has been designated by the numeral 82, which extends to the spool 80, the wire being drawn from the spool and so manipulated as to be passed around the bale to form the band, as will hereinafter appear.

In operation, the pitman 68' normally stands at the forward end of its stroke, so that the needles 23 are retracted to the far side of the bale chamber, and as the plunger rod 18 reciprocates, the bearing 69 will slide back and forth on the pitman without actuating the pitman. Then as the plunger rod 18 moves toward the outer end of its stroke each time, the ratchet wheel 72 will be brought into engagement with the pawl 75' and will be given a slight turn. After a predetermined number of strokes of the plunger rod 18 have been made to complete the bale under construction the wrist pin 73 will be swung or carried into the notch 74 of the pitman, and upon the next inward stroke of the plunger rod, the pitman will be carried with it. Just prior to the engagement of the wrist pin 73 with the pitman, the gong is sounded warning the feeder or attendant, in order that the charge of hay may be withheld. Then as the plunger rod forces the pitman rearwardly or inwardly, the needle yoke 21 will be swung so as to pass or project the needles 23 through the head block. The needles 23 in passing through the head block will be brought into coöperation with the knotting or twisting mechanisms, so that the knotting or twisting mechanisms are brought into operation automatically.

The operation of the tying device is as follows: Supposing that the end of the wire 83 is gripped by the holder 57, and that the corresponding needle has been retracted from the head block, so that the said wire will be drawn back through the slot in the head block and between a pair of registering notches 42, then as the new bale is completed and forced rearwardly in the bale chamber 15, the wire will be drawn therewith so as to pass over the sides and the rear end of the bale. Then as the needle yoke 21 is swung by the rearward or inward stroke of the pitman 68', the corresponding needle will be projected through the head block, thus carrying the wire over the forward end of the bale, it being understood that the wire is threaded through the eye of the needle or between the rollers 24. Then as the needle passes through the head block, the rack 52 will engage with the pinion 34, and the disks 39 and 40 will be rotated forwardly, or in a counter-clockwise direction, as seen in Fig. 3. The parts are so timed, that when the disks have been rotated through an arc of less than 180°, the other registering slots 42 will be brought into wire receiving position below the guide finger 51, and the strand extending from the eye of the needle around the bale will be passed into the registering slots 42 opposite the slots through which the end of the wire passes. The notch 43 of the inner disk 40 is then turned in such a position that the lug 45 will engage therewith, thereby restraining the inner disk against turning, the outer disk, however, being positively rotated, which will cause the wire to be kinked between the two disks, it being noted that the two disks are sufficiently spaced apart to receive the wire therebetween. Then as the lug is raised by the beveled end of the notch 43', the pin 47 carried by the outer disk 39 will engage the end of the slot 46 in the inner disk 40, and the inner disk will be carried with the outer disk, and the wire will be sheared or clipped between the edges of the slots 42 of the outer disk and the shear or knife blade 31ª, as will be apparent. The end of the wire being sheared or clipped off between the outer disk and the knife, will leave a short piece below the holder or grip 57 on the boss 60, and directly after this piece has been sheared off, the cam 68 carried by the needle will engage the lever 62 and will swing the same downwardly so as to release the holder or grip 57. The short piece of wire is thus released, and as the strand of wire extending from the eye of the needle around the bale passes into the registering slots as above described, the same will be directed over the ridge of the frame 28 and under the holder or grip by means of the guide finger 65, so as to wipe or kick the short piece of wire from under the holder, said piece of wire passing downwardly through the chute or passage 67. The cam 68 releases the lever 62 immediately after the short piece of wire has been ejected, so that the wire will be gripped prior to being sheared, to form the last end of the band. The new end of the wire is thus gripped below the holder 57, and as the needle moves toward the outer end of its stroke, the wire will be unrolled from the spool or reel 80, and the strand extending from the eye of the needle to the spool will pass around and within the grooved ledge 26 so as not to interfere with the knotting or twisting disks, or other parts of the knotting or twisting mechanism. The outward stroke of the needle will also rotate the disks in order to knot or twist the ends of the band together, it being noted that the ends of the band are firmly gripped between the disks. Then as the plunger rod 18 moves outward so as to move the pitman 68' outward or forward therewith, the needle will be retracted, and the disks will be given a reverse or backward rotation, clockwise as seen in Fig. 3. The notch 43 of the inner disk will be engaged by the lug 45, and the outer disk will turn slightly while the inner disk is restrained, until the lug 45 is raised by the beveled end of the notch 43' and the pin 47 strikes the proper end of the slot 46, in which event, the inner disk will be rotated positively with the outer disk. In the meantime, the slots 42 of the disks will be brought into registration, and the ends of the band will be freed or released, so that the bale may pass rearwardly in the bale chamber thereby carrying the ends of the band away from the knotting or twisting mechanism. The new end of the wire, however, is still gripped by the holder 57, and as the needle is retracted from the head block, the wire will be drawn backward over the projection 64, and through a pair of registering slots 42 of the disks, the wire extending from the said slots across the bale chamber 15 so as to tie the succeeding bale, as above described. The parts are so timed that when the needle releases the pinion 34, the notches 43'' will be engaged by the lug 45 so as to hold the proper slots 42 in position to receive the wire as the needle is retracted from the head block. The lug 45, however, is readily released from the notches 43'' when the disks are actuated by the needle.

From the foregoing, taken in connection with the drawing, the advantages of the present device will be apparent to those versed in the art, it being noted that the tying device is actuated automatically after a predetermined number of strokes of the plunger rod have been made.

Having thus described the invention, what is claimed as new is:—

1. In combination with a hay baler, a knotting mechanism secured diagonally to one side thereof and embodying a wire cutter, a wire holder coöperating with the wire cutter, a yoke pivoted to the baler with the pivotal point disposed between the sides of the baler, and a curved needle carried by the yoke adapted to be swung through the baler from the side opposite the knotting mechanism and coöperating with the said mechanism to actuate same, the needle having means to release the holder.

2. In combination with a hay baler, a knotting mechanism secured diagonally to one side thereof and embodying a wire cutter, an actuating shaft, and a pinion on the shaft; a wire holder coöperating with the said cutter; a yoke pivoted to the baler with the pivotal point disposed between the sides of the baler, and a curved needle carried by the yoke adapted to be swung through the baler from the side opposite the knotting mechanism, the needle having a rack adapted to mesh with the said pinion, the teeth of the rack and pinion being set obliquely, and the needle having means to release the said holder.

3. In a knotting mechanism for bale tie bands, a complementary pair of disks having diametrically opposite slots, means for rotating one disk, one disk having a slot and the other disk having a pin engaging in the slot for constraining the disks for limited swinging movements relative to each other to bring the slots into and out of registration, yielding frictional means between the disks tending to revolve the disks together, and a spring having a lug, the free disk having a peripheral notch engageable by the lug to restrain it from turning due to the friction of the latter means, the driven disk having a peripheral notch to consonantly receive the lug and to release the lug after the driven disk has rotated a predetermined amount relative to the free disk, and both disks having peripheral notches to receive the lug to hold the disks in wire-receiving position.

4. In a knotting mechanism for bale tie bands, a shell, a tubular shaft journaled therein, a shaft journaled through the tubular shaft, complementary knotting disks secured to the inner ends of the respective shafts, means for rotating the tubular shaft, and means for adjusting the latter shaft within the former.

5. In a knotting mechanism for bale tie bands, a shell having an abutment at its inner end, a knife secured in the abutment, a tubular shaft journaled through the shell from the abutment, a pinion mounted in the shell on the tubular shaft and constrained to turn with the shaft and slide relative thereto, a shaft journaled through the tubular shaft, complementary knotting disks secured to the inner ends of the respective shafts, means for adjusting the tubular shaft to adjust the outer disk relative to the knife, and means for adjusting the other shaft within the tubular shaft to adjust the disks relative to each other.

6. In a knotting mechanism for bale tie bands, a shell having an abutment at its inner end, a knife secured to the abutment, a tubular shaft journaled through the shell from the abutment to the outer end, means for rotating the said shaft, a shaft journaled through the tubular shaft, complementary knotting disks secured to the inner ends to the respective shafts, a member adjustable on the outer end of the tubular shaft and bearing against the outer end of the shell, and a member adjustable on the outer end of the other shaft.

7. In a tying device for hay balers, a shell, a knotting mechanism mounted thereon, a cutter coöperating with the knotting mechanism, a spring pressed wire holder pivoted to the shell adjacent the cutter and coöperating with the shell, and a needle coöperating with the knotting mechanism having means to release the holder.

8. In a tying device for hay balers, a shell, a knotting mechanism mounted thereon, a cutter coöperating with the knotting mechanism, a spring pressed wire holder pivoted to the shell adjacent the cutter and coöperating with the shell, a lever coöperating with the holder to release same, and a needle to operate the knotting mechanism and having a cam to swing the said lever so as to release the wire holder.

9. In a tying device for hay balers, a shell, a knotting mechanism mounted thereon, a cutter coöperating with the knotting mechanism, a spring pressed wire holder pivoted to the shell adjacent the cutter and coöperating with the shell, a needle to operate the knotting mechanism and having means to release the holder, and a guide finger secured to the shell and serving to direct the wire under the wire holder and to wipe the short piece of wire from under the holder.

10. In combination with a hay baler, a knotting mechanism secured diagonally to one side thereof and embodying a wire cutter, a wire holder coöperating with the said cutter, and a curved needle adapted to be swung through the head block from the opposite side and coöperating with the said mechanism to actuate the same, the needle having means to release the holder, a pair of rollers pivoted to the needle adjacent its tip to provide the eye, and the needle being provided with a grooved ledge extending from the said eye in which the strand of wire extending from the eye to a spool is adapted to lie.

11. In combination with a hay baler, a knotting mechanism secured diagonally to one side thereof and embodying a wire cutter, an actuating shaft, and a pinion on the shaft; a wire holder coöperating with the said cutter; a yoke pivoted to the baler with the pivot point between the sides of the baler, a curved needle carried by the yoke adapted to be swung through the baler from the side opposite the knotting mechanism, the needle having a rack adapted to mesh with the said pinion, the teeth of the rack and pinion being set obliquely, and the needle having means to release the holder; and a guide roller carried by the knotting mechanism for engaging the needle to retain the needle in mesh with the pinion.

12. In combination with a hay baler, a knotting mechanism secured diagonally to one side thereof and embodying a wire cutter, an actuating shaft, and a pinion on the shaft; a wire holder coöperating with the said cutter; a curved needle adapted to be swung through the head block from the opposite side, the needle having a rack on one side adapted to mesh with the pinion, the teeth of the rack and pinion being set obliquely, the needle having an eye adjacent its tip, and a grooved ledge extending from the eye to receive the strand of the wire extending to a spool; and a guide roller adapted to contact with the other side of the needle to hold the rack in mesh with the pinion.

13. In combination with a hay baler, a tying mechanism, a pitman connected thereto for operating the tying mechanism, a bearing carried by the actuating mechanism of the baler and loosely engaging the pitman, so that the bearing slides along the pitman as the plunger rod of the baler reciprocates, operative means carried by the bearing and adapted to engage the pitman at the outer end of the stroke of the plunger rod, and means for intermittently operating the said means as the plunger rods reciprocate.

14. In combination with a hay baler, a tying mechanism, a pitman connected thereto for operating the tying mechanism, a bearing carried by the plunger rod of the baler and loosely engaging the pitman, operative means carried by the bearing and adapted to engage the pitman at the outer end of the stroke of the plunger rod, means for intermittently operating the said means as the plunger rod reciprocates, an audible signal, and means carried by the aforesaid means for operating the audible signal prior to the engagement of the aforesaid means with the pitman.

15. In combination with a hay baler, a tying mechanism, a pitman connected thereto for operating the tying mechanism, a bearing carried by the plunger rod of the baler and loosely engaging the pitman, a rotary member carried by the bearing and adapted to engage the pitman at the outer end of the stroke of the plunger rod, and means for intermittently rotating the said member as the plunger rod reciprocates.

16. In combination with a hay baler, a tying mechanism, a pitman connected to the tying mechanism for actuating same, a bearing carried by the plunger rod of the baler and loosely embracing the pitman, a ratchet wheel carried by the bearing and having a projection to engage the pitman, and a dog carried by the frame of the baler and lying in the path of the ratchet wheel to intermittently actuate same as the plunger rod reciprocates.

17. In combination with a hay baler, a tying mechanism, a pitman connected thereto for actuating the same, a bearing carried by the plunger rod of the baler and loosely embracing the pitman, a ratchet wheel carried by the bearing and having a projection to engage the pitman, a dog carried by the frame of the baler and lying in the path of the ratchet wheel to intermittently actuate same as the plunger rod reciprocates, a tappet carried by the ratchet wheel, and a gong having an actuating member adapted to be operated by the said tappet.

In testimony that I claim the foregoing as my own, I have hereto affixed my signature in the presence of two witnesses.

WILLIAM H. LEAVITT.

Witnesses:
P. S. SOWELL,
MILTON PATTITLE.

---

Copies of this patent may be obtained for five cents each, by addressing the "Commissioner of Patents, Washington, D. C."